United States Patent
Rose et al.

(10) Patent No.: US 10,315,632 B2
(45) Date of Patent: Jun. 11, 2019

(54) DUAL MASS FLYWHEEL PROTECTION BY SOFTWARE

(71) Applicant: GM Global Technology Operations LLC, Detroit, MI (US)

(72) Inventors: Steffen Rose, Rüsselsheim (DE); Michael Boehmer, Rüsselsheim (DE); Florian Roemer, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/782,094

(22) Filed: Oct. 12, 2017

(65) Prior Publication Data
US 2019/0111902 A1    Apr. 18, 2019

(51) Int. Cl.
| | |
|---|---|
| *B60T 8/1755* | (2006.01) |
| *F16F 15/131* | (2006.01) |
| *F16D 3/12* | (2006.01) |

(52) U.S. Cl.
CPC .............. *B60T 8/1755* (2013.01); *F16D 3/12* (2013.01); *F16F 15/131* (2013.01); *F16F 15/13128* (2013.01); *F16F 15/13157* (2013.01)

(58) Field of Classification Search
CPC ........ B60T 8/1755; F16D 3/12; F16F 15/131; F16F 15/13128; F16F 15/13157
USPC ....................................................... 475/267
See application file for complete search history.

(56) References Cited

U.S. PATENT DOCUMENTS

| | | | | |
|---|---|---|---|---|
| 5,409,426 A | * | 4/1995 | Berthe .................. | F16H 61/061 475/118 |
| 5,720,533 A | * | 2/1998 | Pastor .................... | B60T 8/175 303/140 |
| 6,923,510 B2 | * | 8/2005 | Hac ........................ | B60T 8/1755 303/122 |
| 9,909,643 B2 | * | 3/2018 | Mahe ....................... | F16D 3/12 |
| 2004/0239180 A1 | * | 12/2004 | Foust .................... | B60T 8/1755 303/152 |

* cited by examiner

*Primary Examiner* — Leslie A Nicholson, III

(57) ABSTRACT

A dual mass flywheel protection system includes an engine coupled to a transmission using a dual mass flywheel defining a drive train. A gear determiner identifies a present operational gear. A filtered engine speed is available. A torque reduction module applies the present operational gear and filtered engine speed producing signals limiting an engine torque to reduce engine torque variations. A first torque limitation option limits engine torque when the drivetrain is coupled, dependent on an engine rpm, which is related to an actual gear selected. A second torque limitation option determines an engine torque reduction during an emergency braking maneuver while an anti-lock brake (ABS) system is active. An engine shut-off module produces an output signal shutting off the engine upon initiation of one of multiple engine shut-off module outputs, and is active when an engine torque limitation due to a low engine rpm is not present.

10 Claims, 1 Drawing Sheet

DUAL MASS FLYWHEEL PROTECTION BY SOFTWARE

FIELD

The present disclosure relates to dual mass flywheels and systems and methods to protect drivetrain components under various driving conditions.

BACKGROUND

The statements in this section merely provide background information related to the present disclosure and may or may not constitute prior art.

Motor vehicle drive trains may include a dual mass flywheel between an engine and a transmission to dampen variations of torque or revolutions of a crankshaft of the engine or prime mover that could cause an unwanted vibration felt by an operator of the motor vehicle. Vibration reduction is achieved by accumulating stored energy in the two flywheel half masses over a period of time using a series of springs and releasing this stored energy.

Present vehicle control systems provide only a basic protection of the dual mass flywheel by shutting off the engine if the engine speed gets to a predetermined low speed during an elongated cranking during engine start. Additional system protection of the dual mass flywheel is therefore warranted under all driving and operating conditions of the vehicle.

SUMMARY

According to several aspects, a dual mass flywheel protection system includes an engine coupled to a transmission using a dual mass flywheel, together defining a drive train. A gear determiner identifies a present operational gear of the transmission. A filtered engine speed of the engine is identified. A torque reduction module applies as input the present operational gear and the filtered engine speed to produce signals to limit an engine torque to reduce or eliminate variations of the engine torque. A first torque limitation option from the torque reduction module applies as an input to an algorithm a limited engine torque resulting from a predetermined low engine rpm. A second torque limitation option from the torque reduction module determines an engine torque reduction during an emergency braking maneuver while an anti-lock brake (ABS) system is active.

In another aspect of the present disclosure, a starting point for limiting the engine torque is a last entry in a torque calibration table.

In another aspect of the present disclosure, the first torque reduction option is only active when the drivetrain is coupled and is dependent on the engine rpm which is related to an actual gear selected. An engine torque reduction counter for each gear will only count upward when the torque reduction is below a threshold.

In another aspect of the present disclosure, the first torque limitation option is available when the engine is running with the drive train coupled.

In another aspect of the present disclosure, the second torque limitation option is available when the ABS system is active, with the engine running and the drive train coupled.

In another aspect of the present disclosure, the engine rpm is applied as an input low rpm as long as the ABS system is active thereby limiting the engine torque.

In another aspect of the present disclosure, an event counter module is provided, wherein an output signal generated by an occurrence of one of the first and the second torque limitation options of the torque reduction module is forwarded to the event counter module.

In another aspect of the present disclosure, the event counter module counts an occurrence as an output signal from any of the first and the second torque limitation options output from the of the torque reduction module and produces a single increment per option signal, each increment saved to an event counter.

In another aspect of the present disclosure, an arbitration module is provided, wherein an output signal generated by an occurrence of one of the first and the second torque limitation options of the torque reduction module forwarded to the arbitration module, the arbitration module identifying if a shut-off release is present and issuing an engine shut-off request signal.

In another aspect of the present disclosure, a gradient limitation module is provided, wherein an output signal generated by an occurrence of one of the first and the second torque limitation options of the torque reduction module is forwarded to the gradient limitation module, the gradient limitation module calculating a final torque request based on a current gear state to identify a torque limitation value, and issuing a torque limitation request.

According to several aspects, a dual mass flywheel protection system includes an engine coupled to a transmission using a dual mass flywheel, together defining a drive train. A gear determiner identifies a present operational gear of the transmission. A filtered engine speed of the engine is determined. An engine shut-off module produces an output signal to shut off the engine upon initiation of one of multiple engine shut-off module outputs.

In another aspect of the present disclosure, a tow-bump start option is provided wherein a vehicle bump start is performed from any initial vehicle speed and when the engine is off, and wherein a sensor detects vehicle motion with the engine in the engine off condition. The engine is kept in the off condition until safe engine start conditions are met. Safe engine start conditions are met after a signal is received from the sensor identifying the tow-bump start has begun, with the signal being held for a predetermined minimum period of time until the engine rpm is below a predetermined threshold thereby ensuring the engine is off, or until the engine rpm exceeds a minimum threshold for a debounced amount of time to ensure the tow-bump start condition is present allowing an engine rpm and a vehicle speed to ramp up to a predetermined minimum prior to permitting engine start.

In another aspect of the present disclosure, a clutch release option is provided which is operational if a clutch is released while the engine is being cranked using a starter motor, and the transmission is not in neutral, wherein while the engine is being cranked, the starter motor is disabled and a fuel injection system is also disabled.

In another aspect of the present disclosure, an elongated crank option is operational if a predetermined maximum period of time of time when the engine is being cranked using a starter motor occurs while in a defined critical resonance zone of engine performance and is temperature dependent on a temperature of an engine coolant, wherein a cranking time is adjusted while in the critical resonance zone and wherein when a predetermined maximum period of time of time of engine cranking occurs while in the defined critical resonance zone of engine performance, the starter motor is disabled and a fuel injection system is also disabled.

In another aspect of the present disclosure, an immediate engine shutoff option stalling the engine is operational if an unavoidable engine stall is ongoing or if a mis-shift occurs, the mis-shift defined as an unintentional shift change of 3 gear ratios, wherein when either the unavoidable engine stall is ongoing or the mis-shift occur when an engine speed is below a gear dependent threshold when the drivetrain is coupled, an immediate engine shut-off command is generated.

In another aspect of the present disclosure, a filtered engine shutoff option is operational if a vehicle driver brakes the vehicle with the engine running without first decoupling the transmission and the drive train, the filtered engine shutoff option generating a command signal to force an engine shut-off following a check confirming the drive train is closed simultaneously with identification of a predetermined value of engine rpm present for a predetermined period of time.

In another aspect of the present disclosure, a stuck below idle engine shutoff option is operational if an engine speed drops below a predefined engine idle speed while the engine is operating in a critical resonance area with the drive train decoupled, wherein the stuck below idle engine shutoff option issues a command signal to force an engine shut-off and is held until the engine rpm is below an rpm threshold for a predetermined period of time and the drivetrain is decoupled or the engine rpm exceeds an rpm threshold for a predetermined period of time.

In another aspect of the present disclosure, a gradient limitation option is operational after an engine shutoff occurs with the drive train still coupled, the gradient limitation option limiting a gradient of a rising engine torque.

According to several aspects, a dual mass flywheel protection system includes an engine coupled to a transmission using a dual mass flywheel, together defining a drive train. A gear determiner identifies a present operational gear of the transmission. A filtered engine speed of the engine is determined. A torque reduction module applies as input the present operational gear and the filtered engine speed to produce signals to limit an engine torque to reduce or eliminate variations of the engine torque. A first torque limitation option from the torque reduction module applies as an input to an algorithm a limited engine torque resulting from a predetermined low engine rpm. A second torque limitation option from the torque reduction module determines an engine torque reduction during an emergency braking maneuver while an anti-lock brake (ABS) system is active. An engine shut-off module produces an output signal to shut off the engine upon initiation of one of multiple engine shut-off module outputs. The first torque reduction option is only active when if the drivetrain is coupled and is dependent on the engine rpm which is related to an actual gear selected. An engine torque reduction counter for each gear will only count upward when the torque reduction is below a threshold. The second torque limitation option is available when the ABS system is active, with the engine running and the drive train coupled.

In another aspect of the present disclosure, an output signal generated by an occurrence of any of the options of the torque reduction module or the engine shut-off module is forwarded to each of an event counter module, an arbitration module, and a gradient limitation module.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
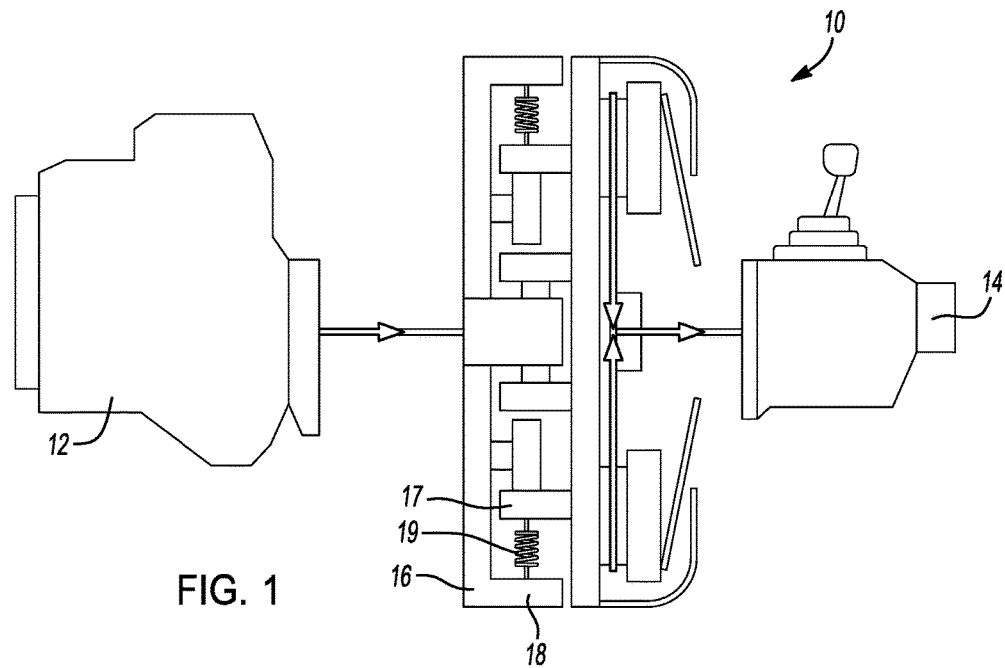
FIG. 1 is a partial cross sectional diagrammatic view of a vehicle.

With reference to FIG. 1, a vehicle 10 includes a prime mover 12 such as a gasoline reciprocating engine providing driving torque to a manual shift transmission 14 via a dual mass flywheel (DMF) 16. The dual mass flywheel 16 is a rotating mechanical device providing continuous energy in the form of rotational energy from the prime mover 12 which is an energy source that is not continuous. The dual mass flywheel 16 includes two flywheel half masses 17, 18 that dampen variations of torque or revolutions of a crankshaft of the prime mover 12 that could cause an unwanted vibration felt by an operator of the motor vehicle 10. Vibration reduction is achieved by accumulating stored energy in the two flywheel half masses 17, 18 over a period of time using a series of springs 19 at a rate that is compatible with the energy source. The springs 19 then release the energy at a much higher rate over a relatively short time.

Figure 2:
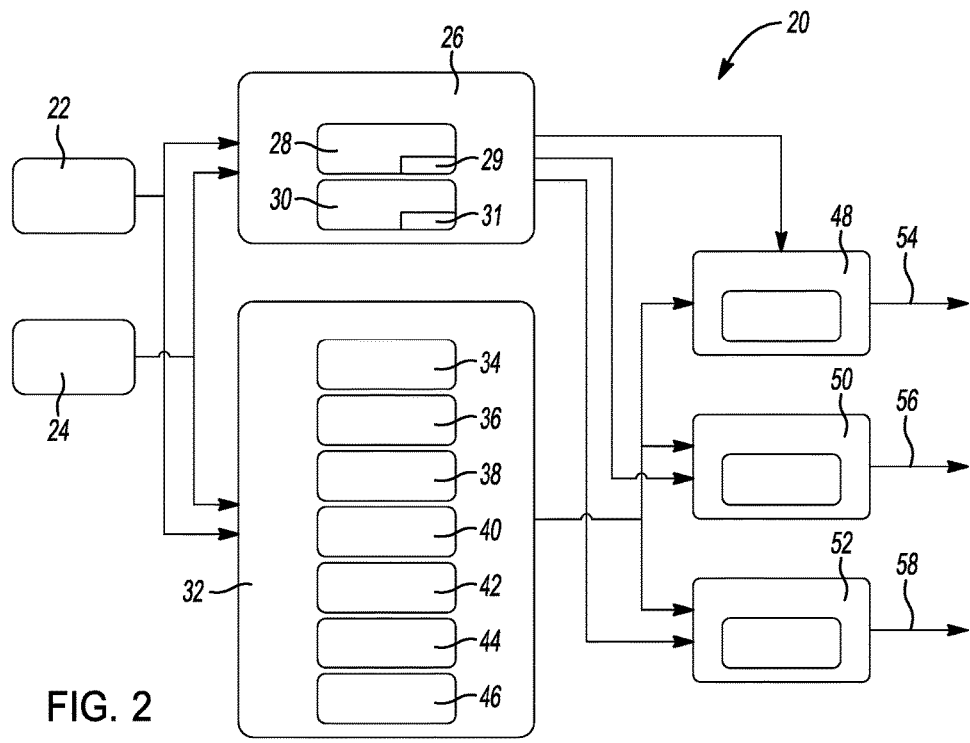
FIG. 2 is a diagrammatic view of the dual mass flywheel protection system of the present disclosure.

Referring to FIG. 2 and again to FIG. 1, a dual mass flywheel protection system 20 is included with the vehicle 10 which analyzes multiple conditions occurring in the vehicle 10 and provides actions based on each condition to protect the dual mass flywheel 16 together with the overall drive train which includes the engine 12, the transmission 14 and the dual mass flywheel 16. The protection system 20 receives as initial input a gear determiner 22 identifying a present operational gear of the transmission 14, and a filtered engine speed 24.

The protection system 20 uses each of the gear determination 22 and the filtered engine speed 24 in a torque reduction module 26 which produces signals to limit an engine torque to reduce or eliminate variations of the engine torque. A first torque limitation option 28 from the torque reduction module 26 is available when the engine is running and the drive train is coupled to the transmission 14. In the first torque reduction option 28 an engine torque will be limited. The first torque reduction option is only active when the drivetrain is coupled and is dependent on the engine rpm which is related to an actual gear selected. An engine torque reduction counter for each gear will only count upward when the torque reduction is below a threshold. to prevent DMF damage. A starting point for limiting the engine torque is a last entry in an engine rpm calibration table 29. An outcome of the engine rpm calibration table 29 is a torque request which is calibratable. The protection provided by the first torque reduction option 28 is only active when the drivetrain is coupled and is dependent on the engine rpm which is related to an actual gear selected. An engine torque reduction counter for each gear will only count upward when the torque reduction is below a threshold. It is also noted that separate limited engine torque values may be obtained based on the engine rpm as a last entry in the engine rpm calibration table 29 for each gear of the transmission 14.

A second torque limitation option 30 from the torque reduction module 26 also uses each of the gear determination 22 and the filtered engine speed 24 and determines if engine torque reduction occurs due to engine rpm reduction during an emergency braking maneuver while an anti-lock brake (ABS) system 31 is active to reduce or eliminate DMF oscillation. The second torque limitation option 30 is available when the ABS system 31 is active, with the engine 12 running, and the drive train coupled to the transmission 14. The torque reduction occurs due to engine rpm reduction as long as the ABS system 31 is active.

When the conditions to achieve the torque reduction option 26 are not available, such as when the engine 12 is being started or is not yet running, the dual mass flywheel protection system 20 provides an engine shut-off module 32 to generate a signal to shut off or prevent starting of the engine 12. The protection system 20 also uses each of the gear determination 22 and the filtered engine speed 24 as necessary during the engine shut-off module 32.

The engine shut-off module 32 includes multiple options. In a first protection option defining a tow-bump start option 34, a vehicle bump start is performed, for which it is initially assumed the vehicle speed is zero or any low vehicle speed such as for example less than 10 kilometers per hour, with the engine 12 off. The engine starter is not used for this option. The vehicle 10 may be on a steep hill to permit a rolling or manual push start, or a person or another vehicle may be available to push the vehicle 10. As the vehicle 10 begins to move or more commonly with the vehicle already moving at a low vehicle speed, the transmission 14 is placed in a forward gear to couple the drive train, and a speed of the engine 12 is therefore allowed to ramp up slowly. A sensor 35 detects vehicle motion with the engine 12 in an engine off condition, and the engine 12 is kept in the off condition until safe engine start conditions are met. After a signal is received from the sensor 35 that a tow or bump start has begun, the signal is held for a predetermined minimum period of time until the engine rpm is below a predetermined threshold thereby ensuring the engine is off, or until the engine rpm exceeds a minimum threshold for a debounced amount of time to ensure the tow-bump start condition is present allowing an engine rpm and a vehicle speed to ramp up to a predetermined minimum prior to permitting engine start.

The engine shut-off module 32 further includes a second protection option defining a clutch release option 36, to protect the DMF if the clutch is released while the engine is being cranked using a starter motor 37. If a clutch release occurs while the engine 12 is being cranked and optionally if the transmission 14 is not in neutral, the starter motor 37 is disabled and a fuel injection system 39 is also disabled to prevent damage to the DMF. If a clutch release is sensed while the engine 12 is being cranked and optionally if the transmission 14 is in neutral, the DMF protection is active and the clutch release is allowed during an engine stop-start event such as at a stop sign when the engine 12 may be stopped temporarily as a fuel savings measure, but not if the engine 12 is being cranked using a key start.

The engine shut-off module 32 further includes a third protection option defining an elongated crank option 38, to protect the DMF if a predetermined maximum period of time of time when the engine is being cranked using the starter motor 37 occurs while in a defined critical resonance zone of engine performance. The elongated crank option 38 is also temperature dependent, wherein cranking time is adjusted while in the critical resonance zone during low temperature conditions of an engine coolant. When the predetermined maximum period of time of engine cranking occurs while in the defined critical resonance zone of engine performance, the starter motor 37 is disabled and the fuel injection system 39 is also disabled to protect the DMF. A temperature cranking time mapping is conducted in conjunction with identifying if the engine cranking is occurring in the critical resonance zone. These conditions are allowed to occur for only a predefined period of time before the starter motor 37 and the fuel injection system 39 are each disabled. The allowable period of time may be extended during very low temperature conditions when the DMF is stiff.

The engine shut-off module 32 further includes a fourth protection option defining an immediate engine shutoff option 40, to protect the DMF an immediate engine shutoff option stalling the engine is operational if an unavoidable engine stall is ongoing or if a mis-shift occurs. A mis-shift is defined as an unintentional shift change of 3 gear ratios, such as for example an upshift from second gear to fifth gear when a shift from second gear to third gear is intended. When either an unavoidable engine stall is ongoing or a mis-shift occurs when an engine speed is below a gear dependent threshold when the drivetrain is coupled, an immediate engine shut-off command is generated to protect the DMF.

The engine shut-off module 32 further includes a fifth protection option defining a filtered engine shutoff option 42, which protects the DMF if the driver slowly brakes the vehicle with the transmission 14 and drivetrain coupled. With the engine 12 running, the filtered engine shutoff option 42 conducts a check to confirm if the drive train is closed simultaneously occurring with a predetermined value of low engine rpm. When the above conditions are present for a predetermined period of time, a command signal is generated to force an engine 12 shut-off.

The engine shut-off module 32 further includes a sixth protection option defining a stuck below idle engine shutoff option 44, to protect the DMF if an engine speed drops below a predefined engine idle speed while the engine is operating in a critical resonance area with the drive train decoupled. With the engine 12 running, the stuck below idle engine shutoff option 44 conducts a check to confirm if the drive train is open (decoupled) together with engine rpm dropping below the predefined engine idle speed, and when these conditions are present a command signal issues to force an engine 12 shut-off. The stuck below idle engine shutoff option 44 is also available to force an engine shut-off under the following conditions: the transmission gear shifter is in the neutral gear position, the engine 12 is running at the predefined engine idle speed, the drive train is decoupled due to the shifter being in the neutral position, and a vehicle speed is zero. This option is used if there is no shifter position sensor available, therefore a drivetrain open indication is not clearly provided or the clutch is not pressed. An assumption is made that the drivetrain has to be open if the engine is running, the clutch is released (closed clutch), and the vehicle speed is zero.

The engine shut-off module 32 further includes a seventh protection option defining a gradient limitation option 46, to protect the DMF after an engine shutoff occurs with the drive train still coupled, by limiting a gradient of rising engine torque. The gradient limitation option 46 may be active for example during a tow-bump start to limit initial engine torque to a zero torque to permit a smooth engine start up.

An output signal generated by an occurrence of any of the options of the torque reduction module 26 and the engine shut-off module 32 is forwarded to an event counter module 48, an arbitration module 50, and a gradient limitation module 52. The event counter module 48 counts an occurrence or output signal from each of the protection options identified above, and produces only a single increment per protection option signal. Each increment is saved to an event counter 54. The arbitration module 50 identifies if a shut-off request is present and issues an engine shut-off request signal 56. The gradient limitation module 52 calculates a final torque request based on a current gear state to identify a torque limitation value, and issues a torque limitation request 58 as necessary.

A dual mass flywheel protection system of the present disclosure offers several advantages. These include the ability to identify operational conditions of a vehicle drive train having a dual mass flywheel and to analyze multiple conditions occurring in the vehicle and provide actions based on each condition to protect the dual mass flywheel. These include the capability to limit an engine torque applying as an input to an algorithm a limited engine torque resulting from a predetermined low engine rpm, to determine if an engine torque reduction can be achieved during an emergency braking maneuver while an anti-lock brake (ABS) system 31 is active, and providing multiple options to shut off the engine when a torque reduction is not sufficient to protect the dual mass flywheel system. The ability to continue driving at a low engine speed without shutting down the engine is also provided.

The description of the invention is merely exemplary in nature and variations that do not depart from the gist of the invention are intended to be within the scope of the invention. Such variations are not to be regarded as a departure from the spirit and scope of the invention.

What is claimed is:

1. A dual mass flywheel protection system, comprising:
   an engine coupled to a transmission using a dual mass flywheel, together defining a drive train;
   a gear determiner identifying a present operational gear of the transmission;
   a filtered engine speed of the engine;
   a torque reducer applying as input the present operational gear and the filtered engine speed to produce signals to limit an engine torque to reduce or eliminate variations of the engine torque;
   a first torque limitation option from the torque reducer limiting the engine torque when the drivetrain is coupled dependent on an engine rpm which is related to an actual gear selected; and
   a second torque limitation option from the torque reducer determines an engine torque reduction during an emergency braking maneuver while an anti-lock brake (ABS) system is active.

2. The dual mass flywheel protection system of claim 1, wherein a starting point for limiting the engine torque is a last entry in an engine rpm calibration table.

3. The dual mass flywheel protection system of claim 2, wherein the first torque reduction option is only active when the drivetrain is coupled and is dependent on the engine rpm which is related to an actual gear selected.

4. The dual mass flywheel protection system of claim 1, wherein the first torque limitation option is available when the engine is running with the drive train coupled.

5. The dual mass flywheel protection system of claim 1, wherein the second torque limitation option is available when the ABS system is active, with the engine running and the drive train coupled.

6. The dual mass flywheel protection system of claim 5, wherein a torque reduction occurs using the second torque limitation option due to engine rpm reduction as long as the ABS system is active.

7. The dual mass flywheel protection system of claim 1, further including an event counter, wherein an output signal generated by an occurrence of one of the first and the second torque limitation options of the torque reducer forwarded to the event counter.

8. The dual mass flywheel protection system of claim 7, wherein the event counter counts an occurrence as an output signal from any of the first and the second torque limitation options output from the of the torque reducer and produces a single increment per option signal, each increment saved to an event counter.

9. The dual mass flywheel protection system of claim 1, further including:
   an arbitration device, wherein an output signal generated by an occurrence of one of the first and the second torque limitation options of the torque reducer is forwarded to the arbitration device; and
   an event counter counting each occurrence of one of the first and the second torque limitation options and producing a single increment per limitation counted;
   wherein the arbitration device issues an engine shut-off request signal.

10. The dual mass flywheel protection system of claim 1, further including a gradient limitation device, wherein an output signal generated by an occurrence of one of the first and the second torque limitation options of the torque reducer is forwarded to the gradient limitation device, the gradient limitation device calculating a final torque request based on a current gear state to identify a torque limitation value, and issuing a torque limitation request.

* * * * *